(12) United States Patent
Nakao et al.

(10) Patent No.: US 8,175,516 B2
(45) Date of Patent: May 8, 2012

(54) COMMUNICATION TERMINAL

(75) Inventors: Masatoshi Nakao, Kanagawa (JP);
Kouji Hatano, Tokyo (JP); Toshio Yagi,
Kanagawa (JP)

(73) Assignee: Panasonic Corporation, Osaka (JP)

( * ) Notice: Subject to any disclaimer, the term of this patent is extended or adjusted under 35 U.S.C. 154(b) by 641 days.

(21) Appl. No.: 11/569,128

(22) PCT Filed: May 31, 2005

(86) PCT No.: PCT/JP2005/009950
§ 371 (c)(1),
(2), (4) Date: Nov. 15, 2006

(87) PCT Pub. No.: WO2006/022059
PCT Pub. Date: Mar. 2, 2006

(65) Prior Publication Data
US 2008/0026790 A1    Jan. 31, 2008

(30) Foreign Application Priority Data

Aug. 27, 2004   (JP) .................................. 2004-247929

(51) Int. Cl.
*H04H 1/00*        (2006.01)
(52) U.S. Cl. .............. 455/3.03; 455/3.02; 455/3.04; 455/556.1; 725/142; 725/74; 725/73; 725/145; 725/113
(58) Field of Classification Search ........... 455/556.1, 455/550.1, 557, 569.2, 191.1, 179.1, 178.1, 455/171.1, 414.2, 3.01; 386/68, 98; 725/47, 725/139, 149, 153, 95, 80–81
See application file for complete search history.

(56) References Cited

U.S. PATENT DOCUMENTS

| 7,055,166 | B1* | 5/2006 | Logan et al. ................... 725/32 |
| 7,107,071 | B1* | 9/2006 | Kwon et al. ............... 455/556.1 |
| 7,123,904 | B2* | 10/2006 | Jang .............................. 455/415 |
| 7,636,544 | B2* | 12/2009 | Yamada et al. ............. 455/3.01 |
| 2002/0054068 | A1* | 5/2002 | Ellis et al. ..................... 345/716 |
| 2004/0052504 | A1* | 3/2004 | Yamada et al. ................ 386/68 |
| 2004/0055011 | A1* | 3/2004 | Bae et al. ......................... 725/62 |
| 2004/0125232 | A1 | 7/2004 | Matsunami |

FOREIGN PATENT DOCUMENTS

| EP | 1432243 A2 * | 6/2004 |
| JP | 2001-326883 A | 11/2001 |
| JP | 2001-339648 | 12/2001 |
| JP | 2002-77865 | 3/2002 |
| JP | 2003-188952 | 7/2003 |

(Continued)

OTHER PUBLICATIONS

Japanese Office action dated Jul. 20, 2010.

*Primary Examiner* — Charles N. Appiah
*Assistant Examiner* — Randy Peaches
(74) *Attorney, Agent, or Firm* — Pearne & Gordon LLP

(57) ABSTRACT

A communication terminal according to the invention aims at improving convenience by proper reflection of a user's intention changing in accordance with a status of the terminal. A portable phone terminal provided with a broadcast program reception function, including: a program reservation unit 31 for reserving a process for a broadcast program; a terminal status detection unit 42 for detecting a status of the terminal; and a terminal operation control unit 43 for performing control to correct the reserved process in accordance with the terminal status up to a predetermined point of time.

11 Claims, 14 Drawing Sheets

FOREIGN PATENT DOCUMENTS

| | | |
|---|---|---|
| JP | 2003-348222 | 12/2003 |
| JP | 2003-348510 | 12/2003 |
| JP | 2004-193973 | 7/2004 |
| JP | 2004-200978 | 7/2004 |
| JP | 2005-184316 | 7/2005 |
| JP | 2005-223801 | 8/2005 |

* cited by examiner

DATA EXAMPLE (1/3)

FIG. 6(a)

PROGRAM RECORDING SETTING TABLE
(OPERATION SETTING HOLDING PORTION 45)    81

| TERMINAL STATUS | OPERATION |
|---|---|
| VIEWING RESERVED PROGRAM | ASK USER FOR CONFIRMATION |
| ENGAGED IN PHONE CALL | RECORD |

FIG. 6(b)

PROGRAM START NOTIFICATION SETTING TABLE
(OPERATION SETTING HOLDING PORTION 45)    82

| CONDITION | OPERATION |
|---|---|
| AT THE PROGRAM START TIME | NOTIFY |
| ONE MINUTE BEFORE START | NOTIFY |
| FIVE MINUTES BEFORE START | NOT NOTIFY |
| VIEWING ALREADY | NOT NOTIFY |
| ENGAGED IN PHONE CALL | NOTIFY ONLY FOR IMPORTANT PROGRAM |
| ON STANDBY | DISPLAY PROGRAM |

DATA EXAMPLE (2/3)

FIG. 7(a)

RESERVATION TABLE (RESERVED INFORMATION HOLDING PORTION 34)   83

|  | PROGRAM NAME | START TIME | END TIME | KEYWORD | IMPORTANCE |
|---|---|---|---|---|---|
| RESERVATION 1 | PROGRAM 1 | 2004/08/02 17:00 | 2004/08/02 17:55 | — | 1 |
| RESERVATION 2 | PROGRAM 2 | 2004/08/03 21:00 | 2004/08/03 22:27 | — | 2 |
| RESERVATION 3 | — | — | — | SINGER a | 3 |
| ⋮ | | | | | |

FIG. 7(b)

TELEPHONE DIRECTORY SETTING TABLE
(TELEPHONE DIRECTORY HOLDING PORTION 64)   84

| TELEPHONE DIRECTORY GROUP NAME | IMPORTANCE |
|---|---|
| BUSINESS | 3 |
| FAMILY | 2 |
| FRIEND | 2 |
| ⋮ | |

DATA EXAMPLE (3/3)

FIG. 8(a)

ALARM SETTING TABLE
(ALARM SETTING HOLDING PORTION 35) ~85

| ALARM KIND | OPERATION |
|---|---|
| RESIDUAL BATTERY POWER | NOTIFY |
| SCHEDULE ALARM | NOTIFY ONLY FOR IMPORTANT SCHEDULE |

FIG. 8(b)

SCHEDULE SETTING TABLE
(ALARM SETTING HOLDING PORTION 35) ~86

|  | CONTENT | ALARM TIME | IMPORTANCE |
|---|---|---|---|
| SCHEDULE 1 | CONFERENCE | 2004/08/02 13:30 | 3 |
| SCHEDULE 2 | BUSINESS TRIP | 2004/08/03 11:00 | 2 |
| SCHEDULE 3 | MEETING | 2004/08/06 19:00 | 3 |
| ⋮ |  |  |  |

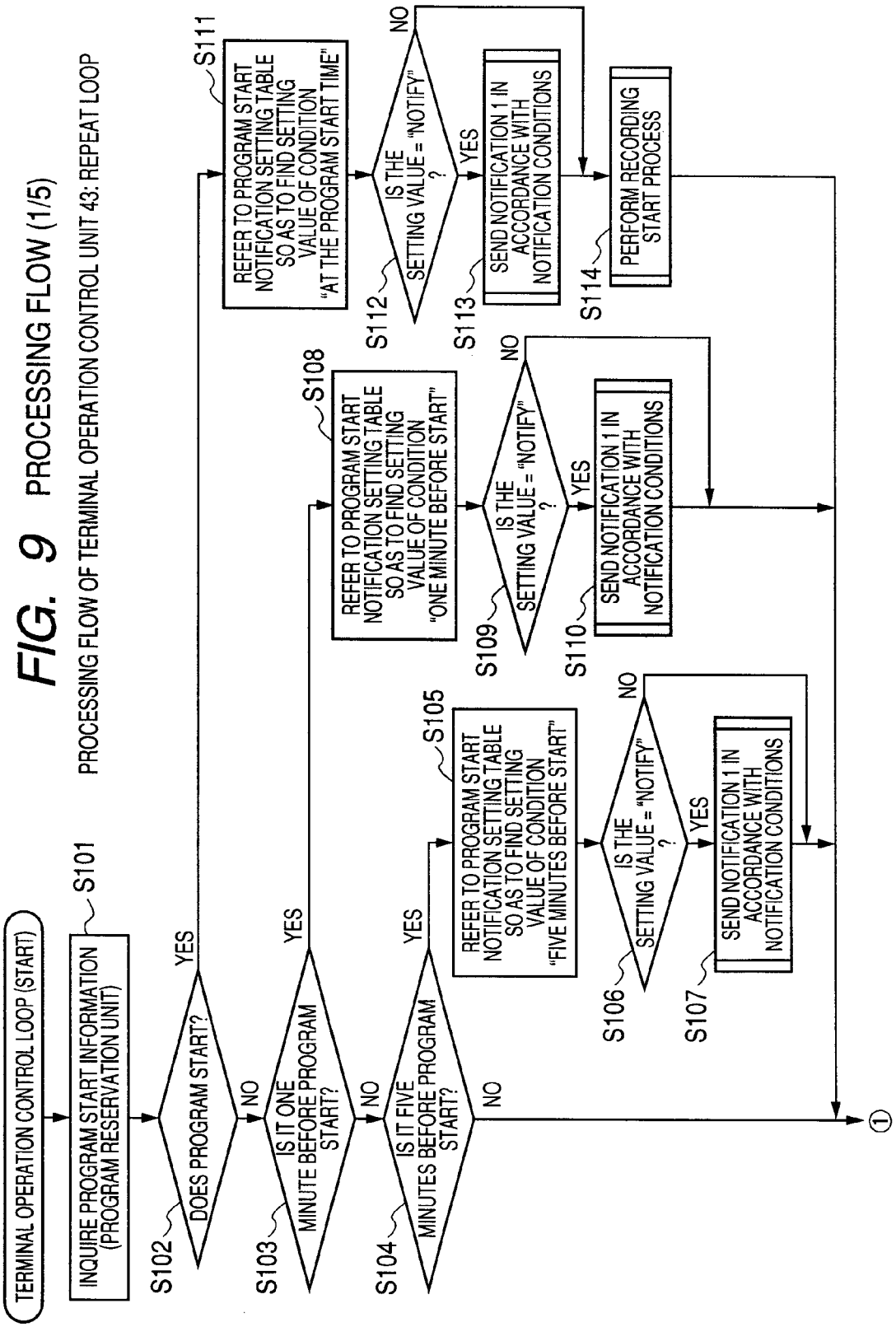
FIG. 9 PROCESSING FLOW (1/5)
PROCESSING FLOW OF TERMINAL OPERATION CONTROL UNIT 43: REPEAT LOOP

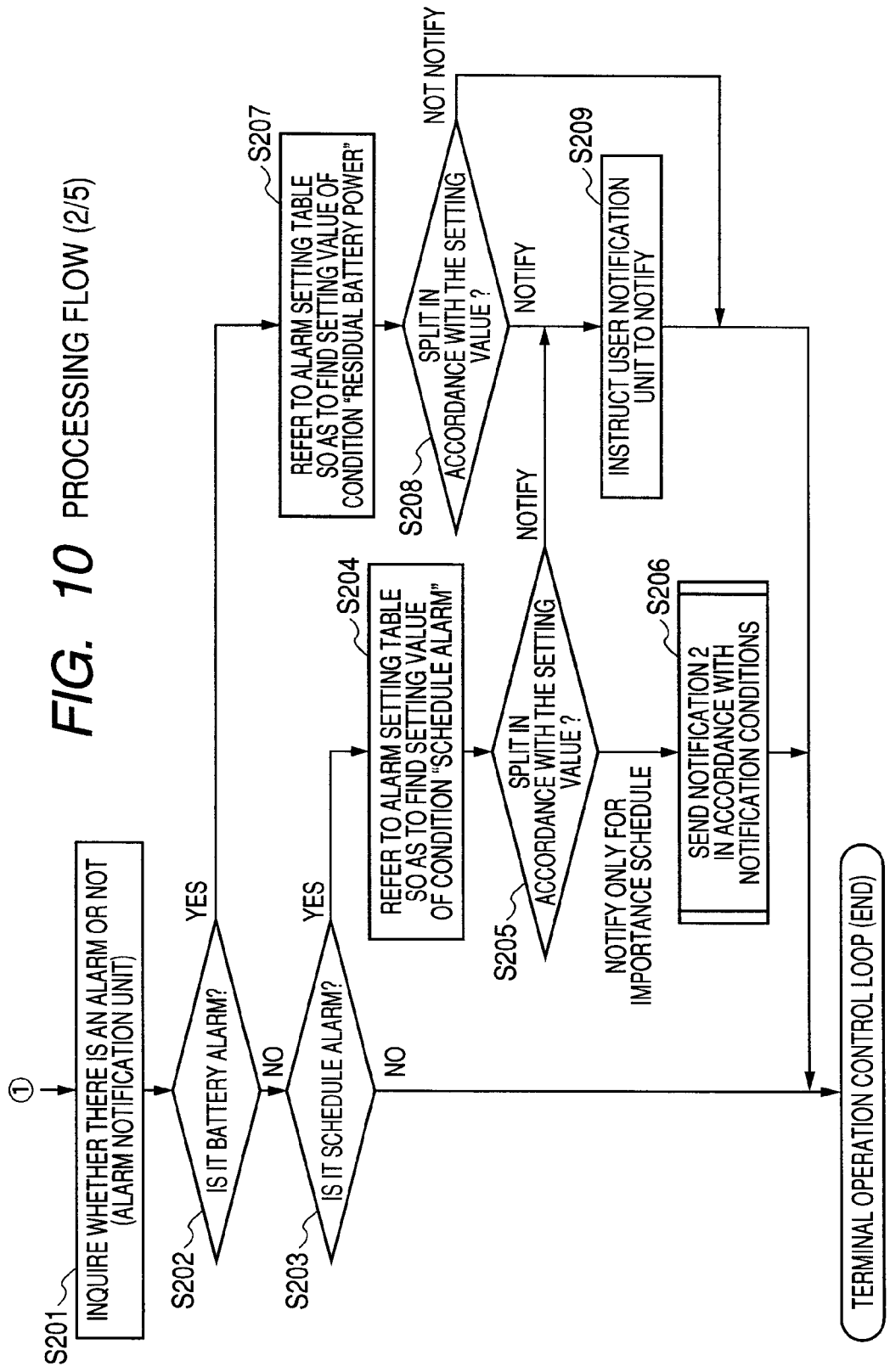
FIG. 10 PROCESSING FLOW (2/5)

PROCESSING FLOW (3/5)

PROCESSING FLOW (4/5)

FIG. 14

| VARIATION | LCD | SP/HS | LED | VIBRATION (vib) |
|---|---|---|---|---|
| (1) | CAPTION DISPLAY "XX WILL START SOON ON CHANNEL Y YOU ARE VIEWING" | — | — | — |
| (2) | CAPTION DISPLAY "XX WILL START SOON ON CHANNEL Y YOU ARE VIEWING" | MAKE ALARM SOUND | — | — |
| (3) | DISPLAY WITH CHARACTERS BLINKING ON/OFF "XX (ON CHANNEL Y)" | — | BLINKING ON/OFF | ON |
| (4) | DISPLAY WITH CHARACTERS BLINKING ON/OFF "XX (ON CHANNEL Y)" | MAKE ALARM SOUND | BLINKING ON/OFF | ON |

COMMUNICATION TERMINAL

TECHNICAL FIELD

The present invention relates to a communication terminal having a broadcast program reception function.

BACKGROUND ART

Along with the progress in multifunction, portable telephone terminals have been heretofore designed to be capable of performing a videophone function, a TV/radio broadcast reception function, an alarm notification function, etc. as well as a phone call function and an electronic mail transmission/reception function. In such a portable phone terminal, not only can a phone call be made during TV watching but also video recording can be made at a point of time that an incoming call is made in the middle of TV watching. Thus, a TV program can be prevented from being missed during the phone call (e.g. see Patent Document 1). Moreover, while a conversation during a videophone call is recorded in a memory, a video image of the videophone calling party can be recorded (e.g. see Patent Document 2).

In such a portable phone terminal having a TV/radio broadcast reception function, etc., video/audio recording of TV broadcasting can be performed on the basis of reservation like an ordinary video recorder and notification can be given by alarm sound at a point of time that recording starts on the basis of the reservation. Some portable phone terminal has a unique function of sending notification by superposing alarm sound on conversation voice when a telephone conversation is made at a point of time that recording starts on the basis of reservation.

Patent Document 1: JP-A-2003-348510
Patent Document 2: JP-A-2003-348222

DISCLOSURE OF THE INVENTION

Problem that the Invention is to Solve

In the portable phone terminal according to the background art, there may be however the case where an operation in the case where video/audio recording is reserved is improper or unnecessary in accordance with a use status of a user because the operation is fixed.

When, for example, reservation is made to perform alarm notification at a recording start time, there is a possibility that an initial part of the program may be missed because the notification is only notification of the point of time. When video recording of a certain program is reserved, the program is still recorded even in the case where the program has been already viewed at the reserved time. This operation is improper to a portable phone terminal having limitation in memory capacity and battery capacity. The method described in Patent Document 1 is however limited to a phone call at the time of viewing TV, so that there is no suggestion for measures concerned with recording. In addition, the method described in Patent Document 2 is not concerned with video recording of a TV broadcast. As described above, the portable phone terminal according to the background art has a video recording function as a unit for reserving a TV/radio program, etc. desired to be viewed/listened to, but this function is aimed at starting recording unconditionally at a point of time that comes to a designated time.

In some cases, the fixed recording operation is improper to a portable phone terminal which can be in any one of various statuses such as a "phone call status", a "viewing the reserved program" status, a "viewing another program than the reserved program" status, an "inoperative" status, etc., at the start time of the reserved program. In addition, there is a possibility that the portable phone terminal cannot perform the recording function and the phone call process per se simultaneously due to its limitation in processing capability. Although a video data recording function and a clock alarm function have been heretofore general, no device like a portable phone terminal having its status changing at a point of time that comes to a reserved point of time has ever existed. For this reason, it is conceived that no discussion has been made about decision of operations of various functions in consideration of the status of the device at a point of time that comes to the reserved point of time.

While installation of a TV reception function in a portable phone terminal has become popular along with introduction of digital terrestrial TV broadcasting, etc., there is however an increasing necessity to operate various functions appropriately in accordance with a use status of the portable phone terminal.

The invention is developed in consideration of the aforementioned situations inherent in the background art. An object of the invention is to provide a communication terminal which can properly reflect a user's intention changing in accordance with a status of the terminal so that convenience can be improved.

Means for Solving the Problem

The communication terminal according to the invention is a communication terminal provided with a broadcast program reception function, including: a reservation unit for reserving a process for a broadcast program; a terminal status detection unit for detecting a status of the terminal; and a control unit for performing control to correct the reserved process in accordance with the terminal status up to a predetermined point of time. According to the aforementioned configuration, the control unit is provided for performing control to correct a reserved process in accordance with the status of the terminal up to a predetermined point of time, so that the reserved process such as recording/display of a broadcast program, etc. can be corrected in accordance with the terminal status. Accordingly, a user's intention changing in accordance with the terminal status can be reflected properly so that convenience can be improved.

In the communication terminal according to the invention, the terminal status detection unit detects the terminal status based on at least one of a program output status, a phone call status, a communication status, a contents reproduction status and a standby status. According to the aforementioned configuration, a user's intention can be reflected based on a terminal status where the program is being output audibly and visibly, or the terminal is engaged in a phone call, or the terminal is on standby.

In the communication terminal according to the invention, the control unit performs control to send alarm notification. According to the aforementioned configuration, start of a reserved program can be notified beforehand.

In the communication terminal according to the invention, the control unit performs control to output a reserved broadcast program audibly and visibly. Moreover, in the communication terminal according to the invention, the control unit performs control to record a reserved broadcast program. According to the aforementioned configuration, for example, a broadcast program whose recording is reserved can be output audibly and visibly and a broadcast program whose output is reserved can be recorded.

In the communication terminal according to the invention, the control unit performs control in a processing mode set by a user. According to the aforementioned configuration, the user can be asked for confirmation of his/her intention at the reserved time, so that the user's intention can be reflected accurately.

In the communication terminal according to the invention, the control unit performs control in accordance with kinds of output broadcast programs. According to the aforementioned configuration, for example, a reserved broadcast program is not recorded when the broadcast program is being output. Thus, a consumed quantity of a memory, consumed power, or the like, can be saved.

In the communication terminal according to the invention, the control unit performs control in accordance with levels of importance set for programs respectively. According to the aforementioned configuration, a user's intention for giving priority to either of a reserved process and a phone call when the communication terminal is engaged in the phone call at the start time of the reserved process can be reflected finely.

In the communication terminal according to the invention, the control unit performs control in accordance with levels of importance set for terminals of phone call parties respectively. According to the aforementioned configuration, a user's intention can be reflected finely in the case where the communication terminal is engaged in a phone call at the reserved time.

The communication terminal according to the invention further includes a program information extraction unit for extracting information concerned with the broadcast program, wherein the control unit performs control in accordance with the extracted information. According to the aforementioned configuration, change etc. of the broadcast program start time can be reflected.

In the communication terminal according to the invention, the control unit performs control in accordance with a voice recognition result of the broadcast program. Moreover, in the communication terminal according to the invention, the control unit performs controls in accordance with an image recognition result of the broadcast program. According to the aforementioned configuration, the following use way is available. That is, when, for example, output of a broadcast program has been reserved, recording of predetermined sound or a predetermined image is started as soon as the predetermined sound or image is output.

The communication terminal according to the invention further includes a setting unit for setting a desirable processing mode for the control unit. According to the aforementioned configuration, a user's intention can be reflected more finely.

Effect of the Invention

According to the invention, a control unit is provided for performing control to correct a reserved process in accordance with a terminal status up to a predetermined point of time so that the reserved process such as recording/display of a broadcast program, etc. can be corrected in accordance with the terminal status. Accordingly, a user's intention changing in accordance with the terminal status can be reflected properly so that convenience can be improved.

BRIEF DESCRIPTION OF THE DRAWINGS

FIG. 6 An example of a program recording setting table 81 and an example of a program start notification setting table 82 both stored in an operation setting holding portion 45.

FIG. 7 An example of a reservation table 83 stored in a reserved information holding portion 34 and an example of a telephone directory setting table 84 stored in a telephone directory holding portion 64.

FIG. 8 An example of an alarm setting table 85 and an example of a schedule setting table 86 both stored in an alarm setting holding portion 35.

FIG. 9 A flow chart (1) showing an example of processing details of a terminal operation control unit 43 in the portable phone terminal according to the embodiment.

FIG. 10 A flow chart (2) showing an example of processing details of the terminal operation control unit 43 in the portable phone terminal according to the embodiment.

FIG. 14 A table for explaining variations of the notification made by a user notification unit 44.

DESCRIPTION OF REFERENCE NUMERALS

Figure 1:
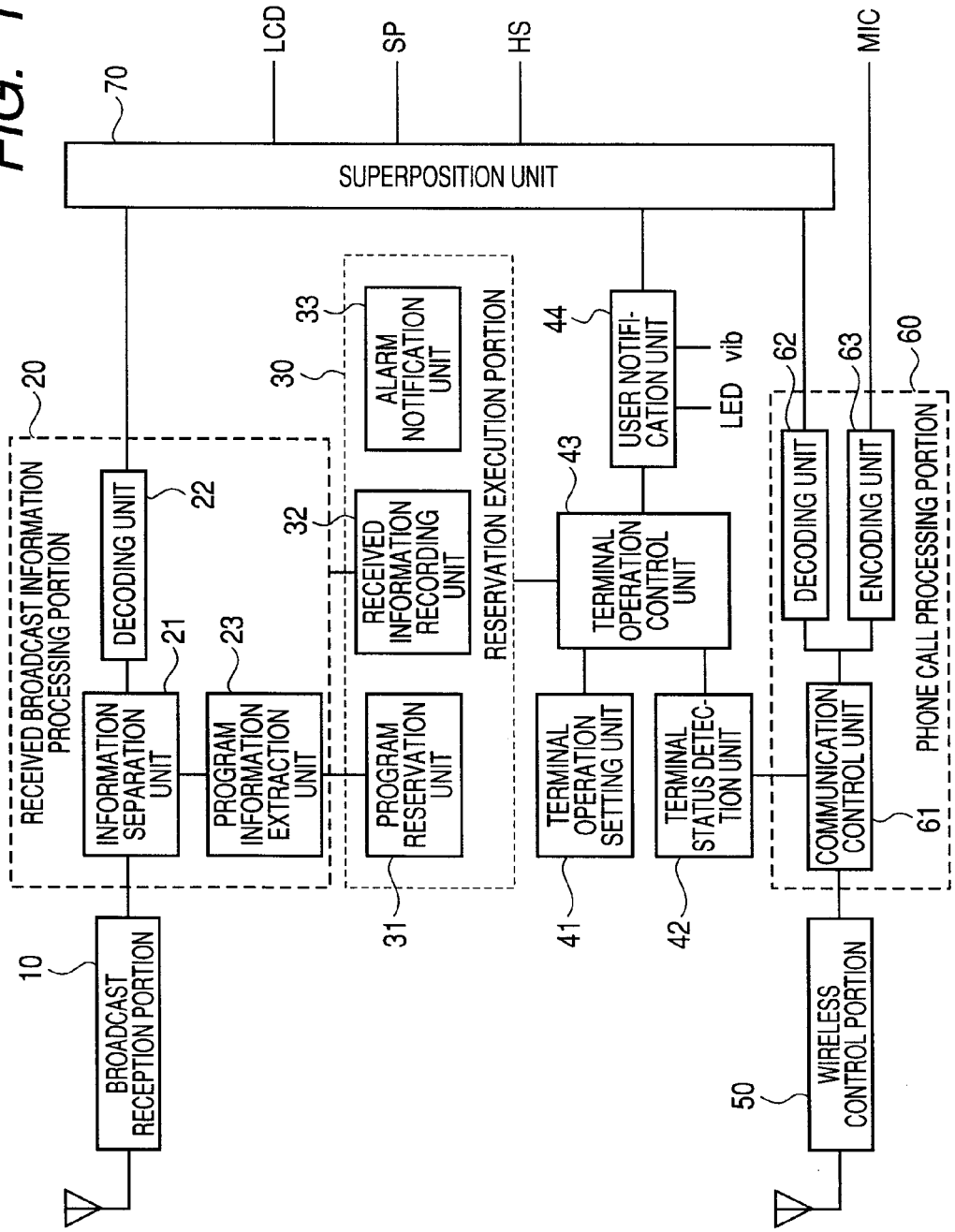
FIG. 1 A diagram showing an overall configuration of a portable phone terminal for explaining an embodiment of the invention.

10 broadcast reception portion
20 received broadcast information processing portion
21 information separation unit
22 decoding unit
23 program information extraction unit
30 reservation execution portion
31 program reservation unit
32 received information recording unit
33 alarm notification unit
34 reserved information holding portion
35 alarm setting holding portion
41 terminal operation setting unit
42 terminal status detection unit
43 terminal operation control unit
44 user notification unit
45 operation setting holding portion
50 wireless control portion
60 phone call processing portion
61 communication control unit
62 decoding unit
63 encoding unit
64 telephone directory holding portion
70 superposition unit
81 program recording setting table
82 program start notification setting table
83 reservation table
84 telephone directory setting table
85 alarm setting table
86 schedule setting table

BEST MODE FOR CARRYING OUT THE INVENTION

FIG. 1 is a diagram showing an overall configuration of a portable phone terminal for explaining an embodiment of the invention.

As shown in FIG. 1, the portable phone terminal according to the embodiment includes a broadcast reception portion 10, an information separation unit 21, a program information extraction unit 23, a decoding unit 22, a wireless control portion 50, a communication control unit 61, a decoding unit 62, and an encoding unit 63. The portable phone terminal according to the embodiment further includes a program reservation unit 31, a received information recording unit 32, an alarm notification unit 33, a terminal status detection unit 42, a terminal operation control unit 43, a terminal operation setting unit 41, a user notification unit 44, and a superposition unit 70.

The broadcast reception portion 10 receives and detects a television broadcast or a radio broadcast. The information separation unit 21 separates the received television/radio broadcast stream into video, audio and data (including program information). The program information extraction unit 23 extracts program information used for program reservation from data (such as EPG (Electronic Program Guide) data, browse information described in BML (Broadcast Markup Language), meta information about programs and scenes). The decoding unit 22 decodes video, audio and data constituting broadcast contents and outputs visible/audible data. The wireless control portion 50 controls connection and communication with a wireless public network and transmits/receives a phone call, an electronic mail, etc. The communication control unit 61 controls a phone call process. The decoding unit 62 decodes received audio data. The encoding unit 63 encodes transmission voice input through a microphone (MIC).

The program reservation unit 31 is provided for reserving a process for a broadcast program. The program reservation unit 31 can reserve a program/scene desired to be viewed in accordance with designated conditions such as broadcast time, performer's name, category, etc., and send notification when the program/scene starts. The received information recording unit 32 records the received broadcast stream in a built-in memory or an external memory. The alarm notification unit 33 sends notification of various alarms (battery alarm, schedule alarm, etc.) generated in the inside of the terminal.

The terminal status detection unit 42 is provided for detecting a status of the terminal. For example, the terminal status detection unit 42 detects which of a program output status, a phone call status and a standby status is the status of the terminal. The terminal operation control unit 43 performs control to correct a reserved process in accordance with the terminal status up to a predetermined point of time. The terminal operation control unit 43 decides and controls the operation of the terminal on the basis of information given from the program information extraction unit 23, the program reservation unit 31, the alarm notification unit 33 and the terminal status detection unit 42. The terminal operation setting unit 41 presents a user with a plurality of options concerned with setting information for defining control details of the terminal operation control unit 43 and holds selected setting information.

Further, the user notification unit 44 notifies the user of the program start/alarm by unit of image display, warning sound reproduction, LED blinking, vibrator (vib) drive, etc. The superposition unit 70 superposes images of a program and voice of a phone call on images and sound generated by the user notification unit 44 and outputs the resulting images and sound to an LCD display and a speaker (SP) or a headset (HS). Incidentally, the LED and the vib may be connected to the superposition unit 70.

First Embodiment

Figure 2:
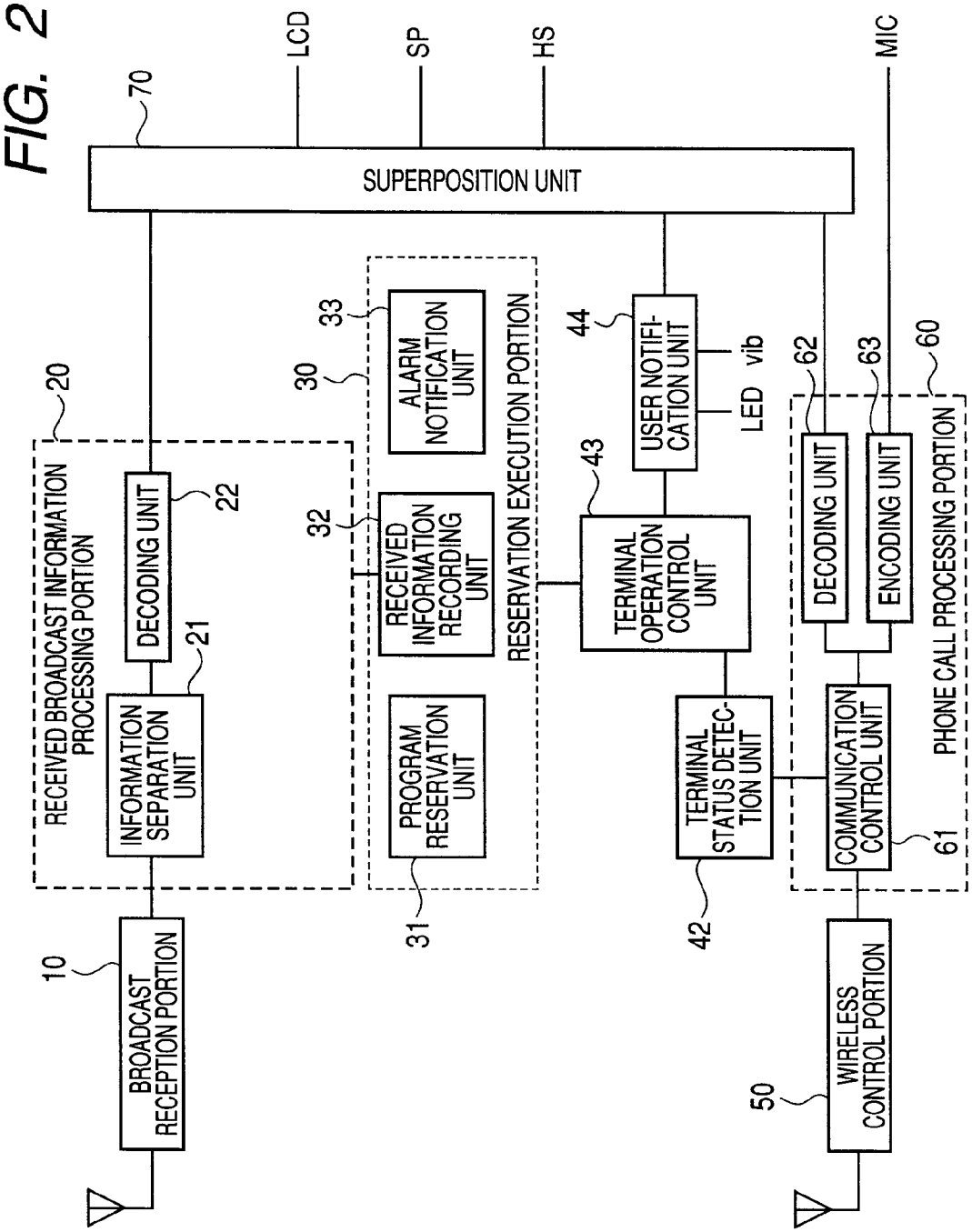
FIG. 2 A diagram showing a schematic configuration of a portable phone terminal for explaining a first embodiment of the invention.

FIG. 2 is a diagram showing a schematic configuration of a portable phone terminal for explaining a first embodiment of the invention. As shown in FIG. 2, the portable phone terminal according to the first embodiment includes a broadcast reception portion 10, a wireless control portion 50, a terminal status detection unit 42, a terminal operation control unit 43, a user notification unit 44, and a superposition mans 70 as described above. The portable phone terminal further includes a received broadcast information processing portion 20, a reservation execution portion 30, and a phone call processing portion 60. The received broadcast information processing portion 20 has an information separation unit 21, and a decoding unit 22. The reservation execution portion 30 has a program reservation unit 31, a received information recording unit 32, and an alarm notification unit 33. The phone call processing portion 60 has a communication control unit 61, a decoding unit 62, and an encoding unit 63.

In the portable phone terminal according to the first embodiment, a terminal status up to a predetermined point of time, that is, a terminal status at a point of time that a reserved program starts or at a point of time that an alarm is generated is detected by the terminal status detection unit 42, and a reserved process which was heretofore a fixed operation is corrected in accordance with the terminal status by the terminal operation control unit 43.

Thus, according to the portable phone terminal in the first embodiment, a reserved process (i.e. video recording in this case) can be corrected appropriately in accordance with a use status of the portable phone terminal though the operation was heretofore fixed, that is, "reservation" was fixed to "recording start" in the case of recording reservation.

That is, "reservation" is positioned simply as a plan in order not to forget to view. At a point of time that comes near a program start time, the portable phone terminal can perform an operation in accordance with the status of the portable phone terminal. That is, the portable phone terminal sends alarm notification when the portable phone terminal is in a standby status (inoperative status). The portable phone terminal records the program when the portable phone terminal is engaged in a phone call.

When, for example, a phone call is made before the start time of the reserved program, notification is sent in advance (this is necessary for a terminal etc. which cannot process recording and phone call simultaneously). When the reserved program is being viewed, the reserved program is not recorded (this is effective in a portable terminal having large memory limitation). Moreover, when another program is being viewed at the broadcast start time, notification is sent in advance. In this manner, an operation can be made in accordance with the status of the portable phone terminal.

When control is performed thus to correct a reserved process in accordance with a terminal status up to a predetermine point of time, the reserved process such as video recording of a TV program (or audio recording of a radio program) can be corrected in accordance with the terminal status. Accordingly, a user's intention changing in accordance with the terminal status can be reflected appropriately so that convenience can be improved.

Second Embodiment

Figure 3:
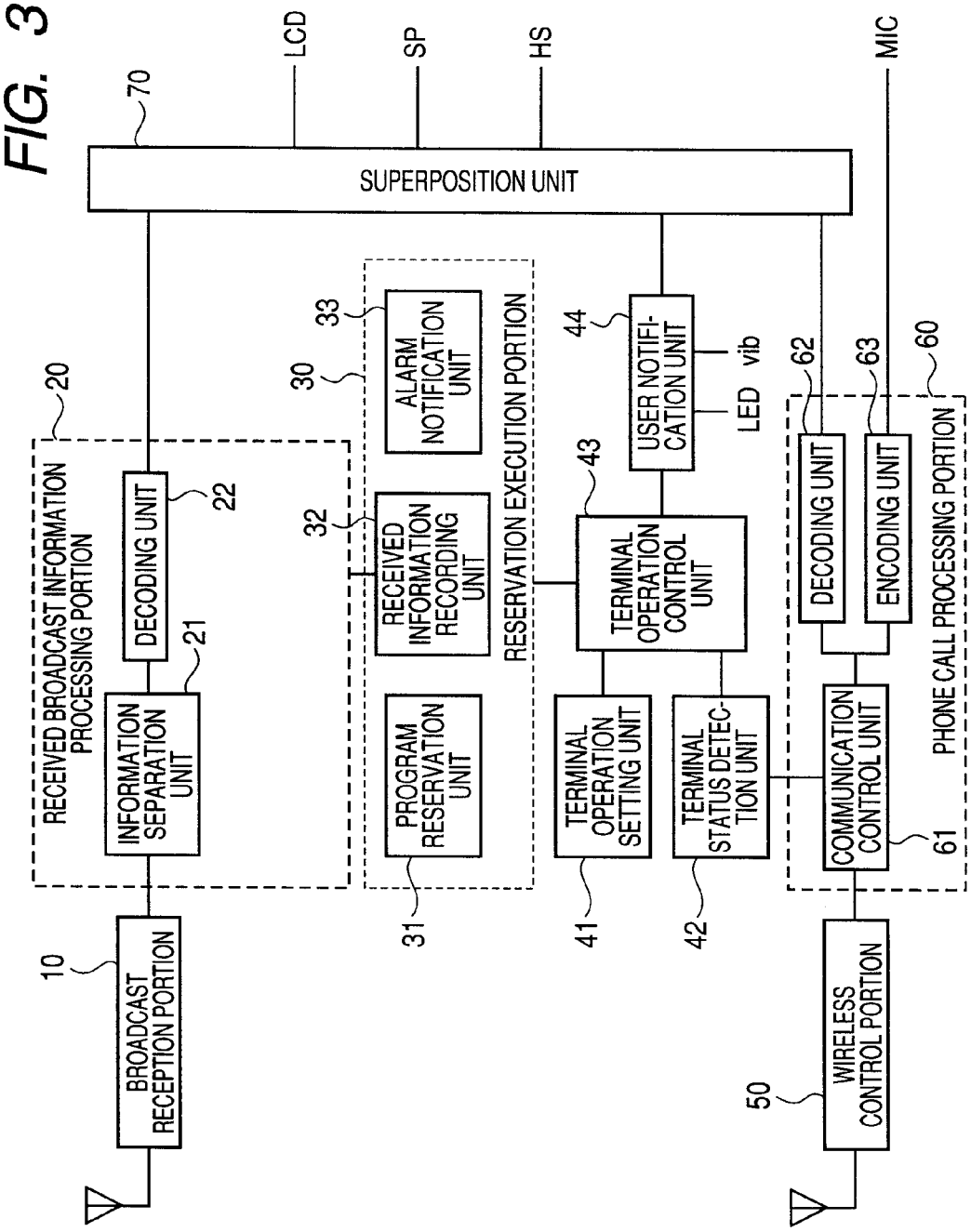
FIG. 3 A diagram showing a schematic configuration of a portable phone terminal for explaining a second embodiment of the invention.

FIG. 3 is a diagram showing a schematic configuration of a portable phone terminal for explaining a second embodiment of the invention. In FIG. 3, parts the same as those in FIG. 2 described in the first embodiment are referred to by the same numerals for the sake of omission of description.

The portable phone terminal according to the second embodiment includes a terminal operation setting unit 41 for holding setting information for defining control details of the terminal operation control unit 43, in addition to the first embodiment. A user can beforehand set an operation at a point of time that a program starts or at a point of time that an alarm is generated.

According to the portable phone terminal in the second embodiment, a terminal operation can be controlled in accordance with user's preference, constraints on the terminal operation and importance of reserved programs/alarms. For example, an operation in the case where a phone call is made at a point of time that comes to the start of the broadcast can be selected in accordance with user's preference. That is, recording can be started at a point of time that comes to the start of the broadcast (only if simultaneous processing is allowed), program start notification can be sent by voice N minutes before the program start or program playback can be started (if reproduction and phone call can be processed simultaneously).

Third Embodiment

Figure 4:
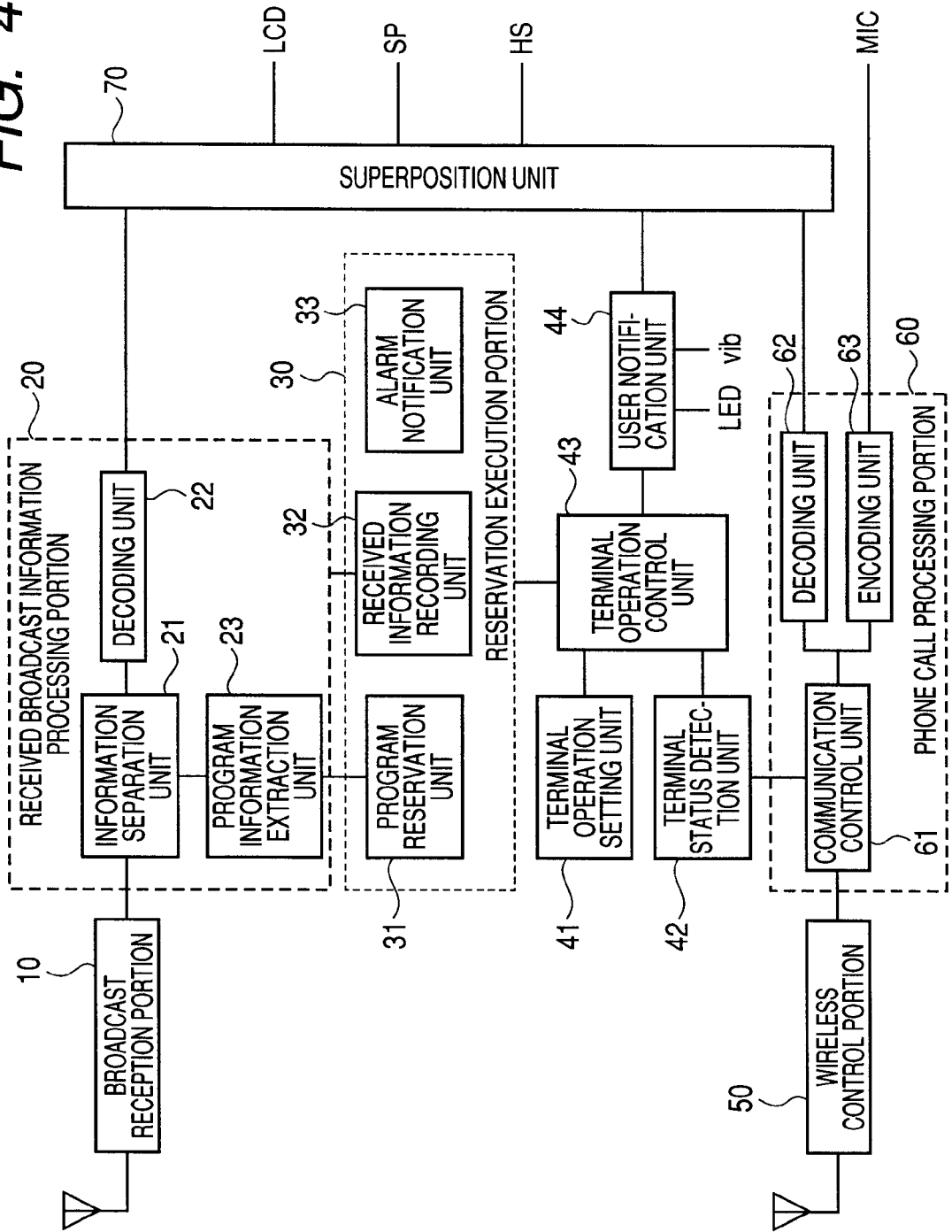
FIG. 4 A diagram showing a schematic configuration of a portable phone terminal for explaining a third embodiment of the invention.

FIG. 4 is a diagram showing a schematic configuration of a portable phone terminal for explaining a third embodiment of the invention. In FIG. 4, parts the same as those in FIG. 3 described in the second embodiment are referred to by the same numerals for the sake of omission of description.

The portable phone terminal according to the third embodiment includes a program information extraction unit 23 for extracting program information used for program reservation from data such as EPG data, browse information described in BML, meta-information about programs and scenes, etc., in addition to the second embodiment. The program information extraction unit 23 extracts information concerned with broadcasting (such as EPG, browser display data, and program meta-data) and sends the extracted information to the program reservation unit 31 and the terminal operation control unit 43.

The program information extraction unit 23 may have a voice recognition function for recognizing voice data output from the decoding unit 22 to thereby extract information concerned with broadcasting (program's name, performer's name, voice artist's name, keyword contained in audio, etc.) and send the extracted information to the program reservation unit 31 and the terminal operation control unit 43. The program information extraction unit 23 may further have an image recognition function for recognizing image data output from the decoding unit 22 to thereby extract information concerned with broadcasting (program's name, performer's name, person or character's name in the play, character string of a telop, subject's name (e.g. "car" or "ship") etc.) and send the extracted information to the program reservation unit 31 and the terminal operation control unit 43.

According to the portable phone terminal in the third embodiment, the latest EPG data can be sent to the program reservation unit 31 to change reservation details (start time point etc.) automatically even in the case where there is change in broadcast time. Accordingly, the user can be prevented from missing the reserved program.

In addition, reservation in order of importance can be made on the basis of information (browser display data etc.) received sequentially together with programs and information extracted in real time from video and audio of the programs. Thus, notification can be sent in accordance with a finer unit than a program.

For example, start of an emergency broadcast can be notified. Notification can be sent as a "high importance" event when voice of a user's favorite talent is detected. Notification can be sent when a specific keyword (e.g. "extremely cheap" etc.) appears in details of browser display information described in BML.

Fourth Embodiment

Figure 5:
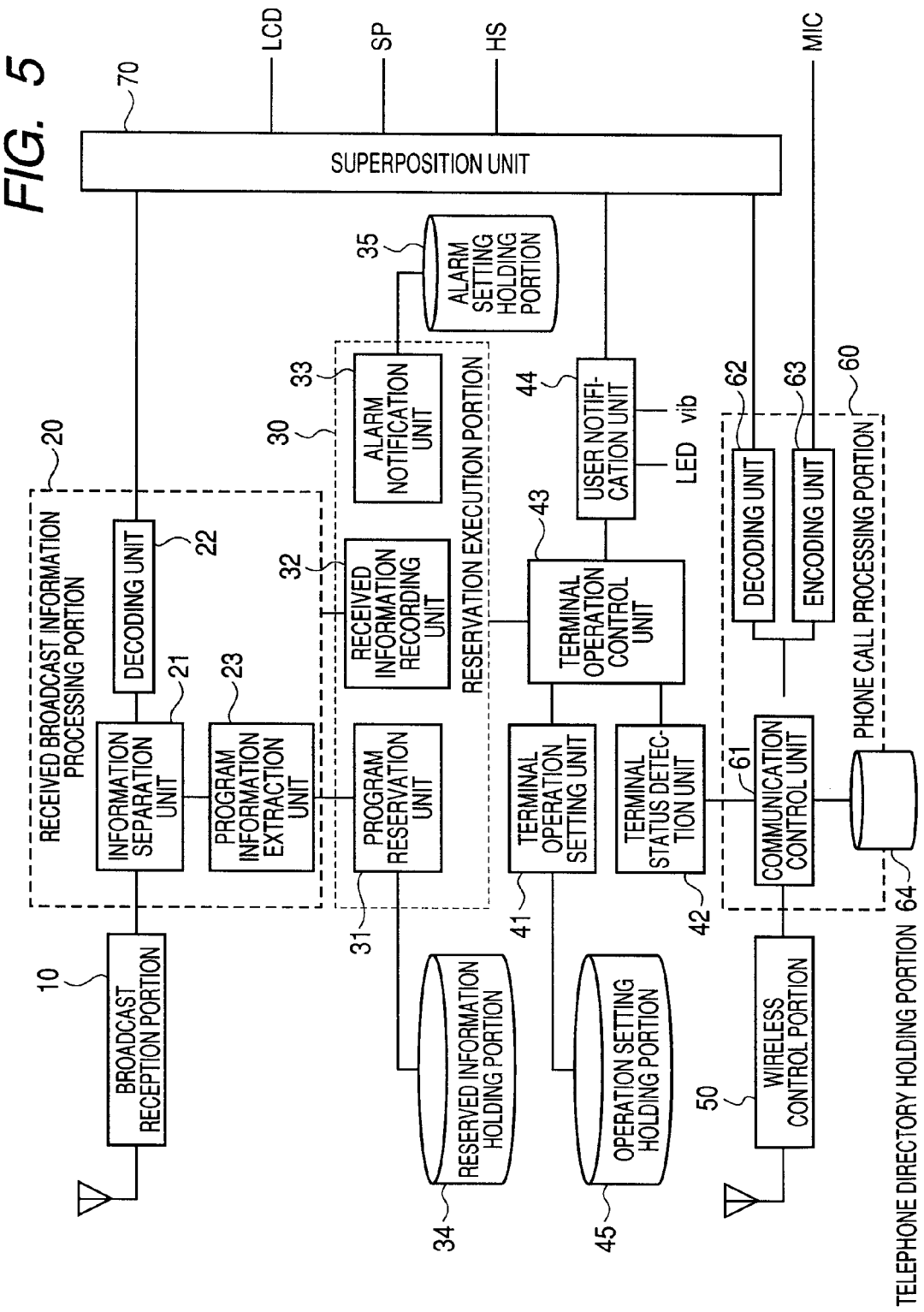
FIG. 5 A diagram showing a schematic configuration of a portable phone terminal for explaining a fourth embodiment of the invention.

FIG. 5 is a diagram showing a schematic configuration of a portable phone terminal for explaining a fourth embodiment of the invention. In FIG. 5, parts the same as those in FIG. 4 described in the third embodiment are referred to by the same numerals for the sake of omission of description.

The portable phone terminal according to the fourth embodiment includes a reservation information holding portion 34 for storing setting information concerned with reservation, an alarm setting holding portion 35 for storing setting information concerned with alarms, an operation setting holding portion 45 for storing setting information concerned with operations of the terminal, and a telephone directory holding portion 64 for storing setting information concerned with phone numbers, in addition to the third embodiment.

FIG. 6 shows an example of a program recording setting table 81 and an example of a program start notification setting table 82 both stored in the operation setting holding portion 45. That is, setting for asking a user for confirmation as to whether or not a reserve program has to be recorded when the reserved program has been already viewed on the terminal at a reserved time, and setting for recording the reserved program when the terminal is engaged in a phone call at the reserved time are registered in the program recording setting table 81. These settings can be made by the user beforehand.

Moreover, the following operations as operations of the terminal in the case where a program has been reserved are registered in the program start notification setting table 82. That is, (1) notify at the reserved program start time, (2) notify one minute before the reserved program starts, (3) not notify five minutes before the reserved program starts, (4) not notify when the reserved program has already been viewed at the reserved program start time, (5) notify only for an important program when the terminal is engaged in a phone call at the reserved program start time, and (6) display the program when the terminal is on standby at the reserved program start time. These settings can be made by the user beforehand.

FIG. 7 shows an example of a reservation table 83 stored in the reserved information holding portion 34, and an example of a telephone directory setting table 84 stored in the telephone directory holding portion 64. That is, in the reservation table 83, program name 1, start time, end time, and importance 1 are registered as reservation 1, program name 2, start time, end time, and importance 2 are registered as reservation 2, and keyword "signer a" and importance 3 are registered as reservation 3.

When a keyword is set, recording can be started from the program start time of a broadcast program based on a broadcast schedule in the case where the keyword is contained in browser display data of the broadcast program described in BML etc. In addition, importance 3 is the highest importance. When one reservation overlaps with another reservation, priority is given to reservation with higher importance.

Telephone directory group name and importance are registered in the telephone directory setting table 84. In this example, business group is set on importance 3, family group is set on importance 2, and friend group is set on importance 2. These levels of importance can be set by the user beforehand and are taken into consideration when operations of the terminal are decided.

FIG. 8 shows an example of an alarm setting table 85 and an example of a schedule setting table 86 both stored in the alarm setting holding portion 35. That is, kind of alarm and operation are registered in the alarm setting table 85. For example, setting is made so that (1) notification is sent when the residual battery power is few and (2) a schedule alarm is notified only for an important schedule.

In the schedule setting table 86, content "conference", alarm time and importance 3 are registered as schedule 1; content "business trip", alarm time and importance 2 are registered as schedule 2; and content "meeting", alarm time and important 3 are registered as schedule 3. These registration details can be set by the user beforehand and are taken into consideration when operations of the terminal are decided.

FIG. 9 is a flow chart showing an example of processing details of the terminal operation control unit 43 in the portable phone terminal according to this embodiment. When a terminal operation control loop is started, the program reservation unit 31 first inquires program start time information (step S101). Judgment is then made as to whether it is a program start time or not (step S102). In the case where it is the program start time (Y), the program start notification setting table 82 (see FIG. 6) is referred to so as to find a setting value of condition "program start time" (step S111). Judgment is then made as to whether the setting value is "notify" or not (step S112). In the case where the setting value is "notify" (Y), a subroutine for notification 1 in accordance with notification conditions (as will be described in FIG. 11) is performed (step S113). A subroutine for a recording start process (as will be described in FIG. 12) is then performed (step S114).

On the other hand, when it is not the program start time in the step S102, judgment is made as to whether it is one minute before the program start or not (step S103). When it is one minute before the program start (Y), the program start notification setting table 82 is referred to so as to find a setting value of condition "one minute before start" (step S108). Judgment is then made as to whether the setting value is "notify" or not (step S109). When the setting value is "notify" (Y), a subroutine for notification 1 in accordance with notification conditions is performed (step S110).

When it is not one minute before the program start in the step S103, judgment is made as to whether it is five minutes before the program start or not (step S104). When it is five minutes before the program start (Y), the program start notification setting table 82 is referred to so as to find a setting value of condition "five minutes before start" (step S105). Judgment is then made as to whether the setting value is "notify" or not (step S106). When the setting value is "notify" (Y), a subroutine for notification 1 in accordance with notification conditions is performed (step S107).

Then, the routine of processing is shifted to FIG. 10. The alarm notification unit 33 is inquired whether there is an alarm or not (step S201). Judgment is then made as to whether there is a battery alarm or not (step S202). When there is a battery alarm (Y), the alarm setting table 85 (see FIG. 8) is referred to so as to find a setting value of condition "residual battery power" (step S207). The setting value is then decided (step S208). When the setting value is "notify", an instruction to notify is given to the user notification unit 44 (step S209).

On the other hand, when there is no battery alarm in the step S202, judgment is then made as to whether there is a schedule alarm or not (step S203). When there is a schedule alarm (Y), the alarm setting table 85 is referred to so as to find a setting value of condition "schedule alarm" (step S204). Then, the setting value is decided (step S205). When the setting value is "notify only for important schedule", a subroutine for notification 2 in accordance with notification conditions (as will be described in FIG. 13) is performed (step S206). Thus, the terminal operation control loop is completed.

Figure 11:
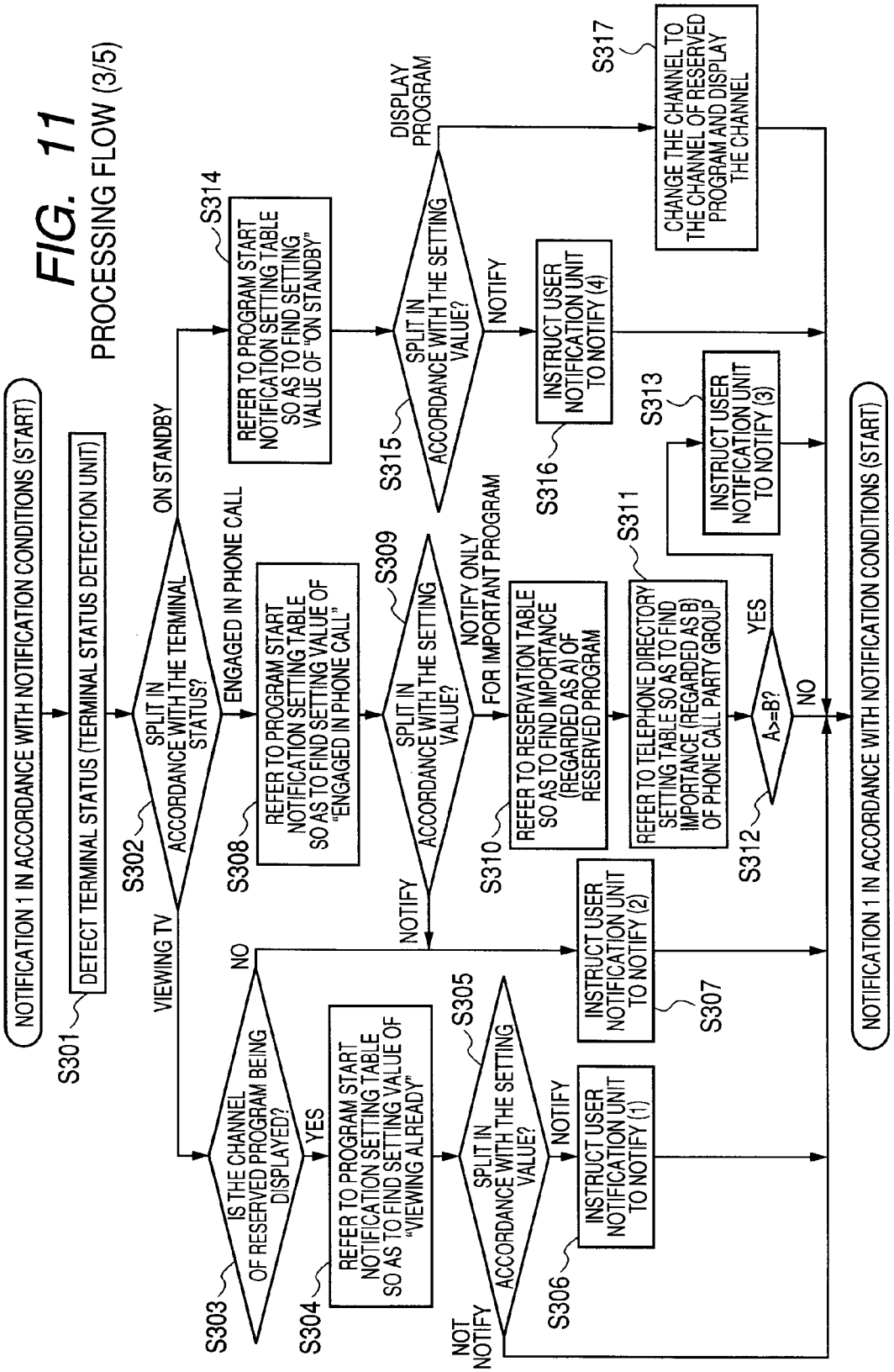
FIG. 11 A flow chart showing a subroutine for performing notification 1 in accordance with notification conditions.

FIG. 11 shows the subroutine for performing notification 1 in accordance with notification conditions. When the subroutine for notification 1 is started, the terminal status is first detected by the terminal status detection unit 42 (step S301). The terminal status is then decided (step S302). When the terminal status is viewing TV, judgment is made as to whether the channel of a reserved program is being displayed or not (step S303). When the channel of the reserved program is being displayed (Y), the program start notification setting table 82 is referred to so as to find a setting value of "viewing already" (step S304).

The setting value is then decided (step S305). When the setting value is "notify", an instruction to perform notification of variation (1) is given to the user notification unit 44 (step S306). The notification of variation (1) is displayed, for example, as "XX will start soon on the channel you are viewing" in the form of a caption on the LCD, as shown in FIG. 14.

On the other hand, when the channel of the reserved program is not being displayed in the step S303, an instruction to perform notification of variation (2) is given to the user notification unit 44 (step S307). The notification of variation (2) is displayed, for example, as "XX will start soon on channel Y you are viewing" in the form of a caption on the LCD, as shown in FIG. 14, while alarm sound is made through a speaker or a headset.

When the terminal status is engaged in a phone call in the step S302, the program start notification setting table 82 is referred to so as to find a setting value of "engaged in phone call" (step S308). The setting value is then decided (step S309). When the setting value is "notify only for important program", the reservation table 83 (see FIG. 7) is referred to so as to find importance of the reserved program (here, the importance of the reserved program is regarded as A) (step S310).

Then, the telephone directory setting table 84 (see FIG. 7) is referred to so as to find importance of a phone call party group (importance of the phone call party group is regarded as B) (step S311). The importance A and the importance B are determined respectively (step S312). When the importance A of the reserved program is more important than or equal to the importance B of the phone call party group (Y), an instruction to perform notification of variation (3) is given to the user notification unit 44 (step S313). As shown in FIG. 14, the notification of variation (3) is displayed as "XX (on channel Y)!!" in characters blinking on/off on the LCD, while the LED is turned on and off and vibration (vib) is given.

On the other hand, when the terminal status is on standby in the step S302, the program start notification setting table 82 is referred to so as to find a setting value of "on standby" (step S314). The setting value is then decided (step S315). When the setting value is "notify", an instruction to perform notification of variation (4) is given to the user notification unit 44 (step S316).

As shown in FIG. 14, the notification of variation (4) is displayed as "XX (on channel Y)!!" in characters blinking/off on the LCD, while alarm sound is made through the speaker or headset, the LED is turned on/off and vibration (vib) is made. On the other hand, when the setting value is "display program" in the step S315, the channel is changed to the channel of the reserved program so that the channel of the reserved program is displayed (step S317). Thus, the subroutine for notification 1 in accordance with notification conditions is completed.

Figure 12:
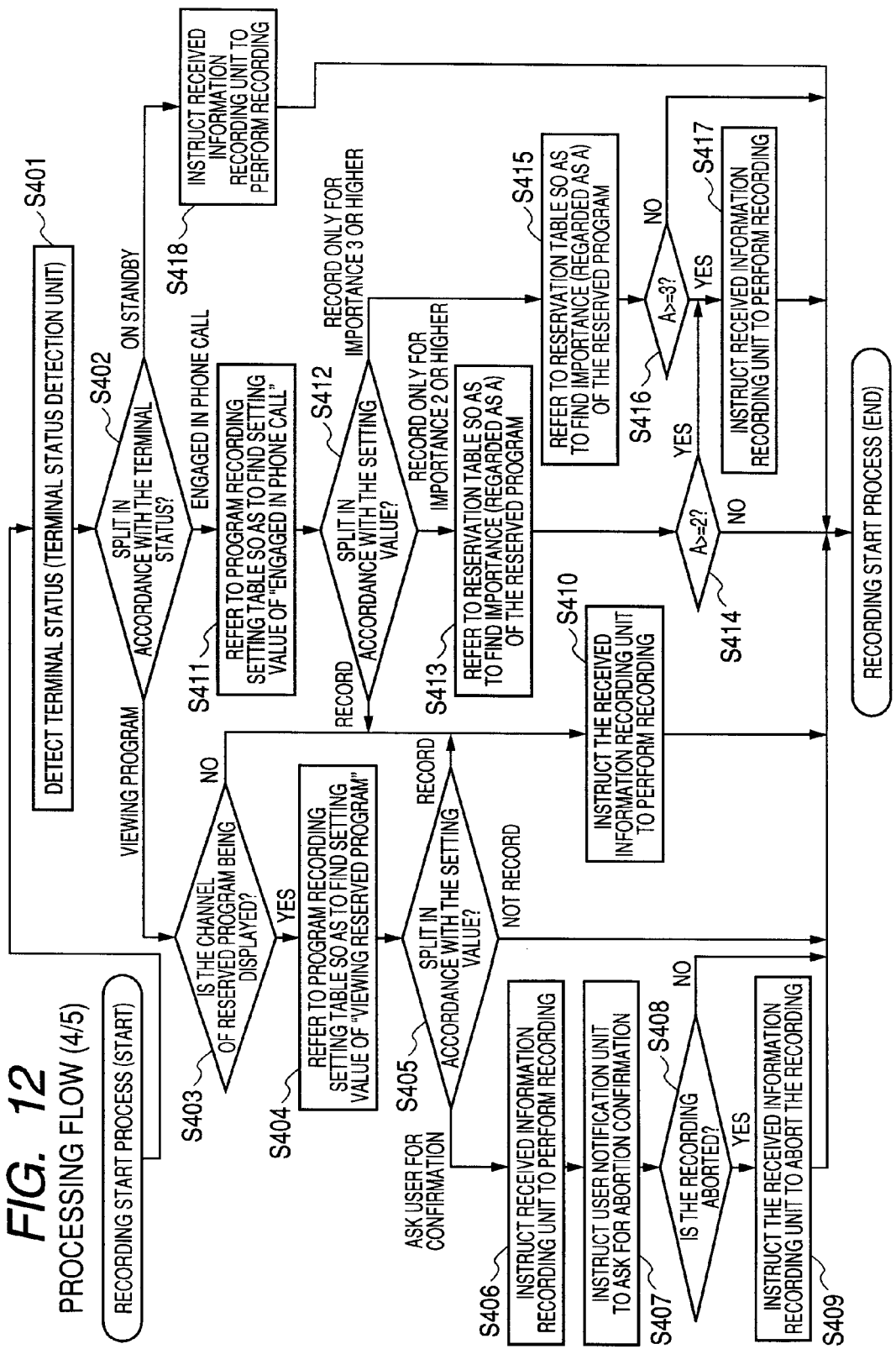
FIG. 12 A flow chart showing a recording start processing subroutine.

FIG. 12 shows the subroutine for a recording start process. When the subroutine for a recording start process is started, the terminal status is first detected by the terminal status detection unit 42 (step S401). The terminal status is then decided (step S402). When the terminal status is viewing a program, judgment is made as to whether the channel of the reserved program is being displayed or not (step S403). When the channel of the reserved program is being displayed (Y), the program recording setting table 81 (see FIG. 6) is referred to so as to find a setting value of "viewing reserved program" (step S404). The setting value is then decided (step S405).

When the setting value is "ask user for confirmation", the received information recording unit 32 is instructed to record (step S406). The user notification unit 44 is instructed to send abortion confirmation (step S407). Judgment is made as to whether recording is aborted or not (step S408). When recording is aborted (Y), the received information recording unit 32 is instructed to abort recording (step S409). On the other hand, when the channel of the reserved program is not being displayed in the step S403, and when the setting value is "record" in the step S405, the received information recording unit 32 is instructed to record (step S410).

When the terminal status is engaged in a phone call in the step S402, the program recording setting table 81 is referred to so as to find a setting value of "engaged in phone call" (step S411). The setting value is then decided (step S412). When the setting value is "record only for importance 2 or higher", the reservation table 83 is referred to so as to find importance of the reserved program (here, the importance of the reserved program is regarded as A) (step S413). Judgment is made as to whether or not the setting value is 2 or higher (step S414). When the importance A of the reserved program is 2 or higher (Y), an instruction to record is given to the received information recording unit 32 (step S417).

On the other hand, when the setting value is "record only for importance 3 or higher" in the step S412, the reservation table 83 is referred to so as to find the importance of the reserved program (here, the importance of the reserved program is regarded A) (step S415). Judgment is made as to whether or not the setting value is 3 or higher (step S416). When the importance A of the reserved program is 3 or higher (Y), an instruction to record is given to the received information recording unit 32 (step S417). When the terminal status is on standby in the step S402, an instruction to record is given to the received information recording unit 32 (step S418). Thus, the subroutine for a recording start process is completed.

Figure 13:
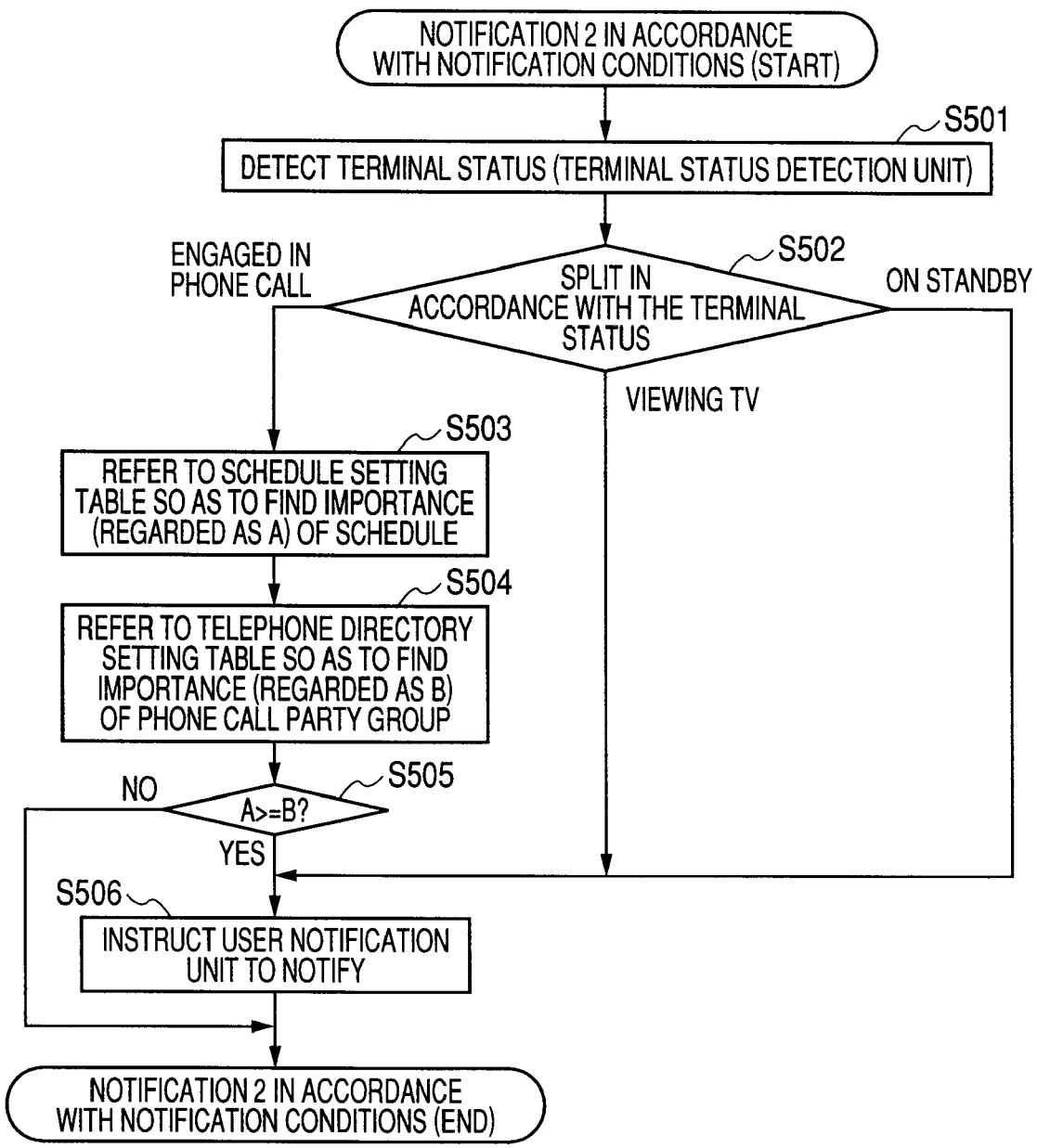
FIG. 13 A flow chart showing a subroutine for performing notification 2 in accordance with notification conditions.

FIG. 13 shows the subroutine for performing notification 2 in accordance with notification conditions. When the subroutine for notification 2 is started, the terminal status is first detected by the terminal status detection unit 42 (step S501). The terminal status is then decided (step S502). When the terminal status is "engaged in phone call", the schedule setting table 86 (see FIG. 8) is referred to so as to find importance of a schedule (here, the importance of the schedule is regarded as A) (step S503). The telephone directory setting table 84 (see FIG. 7) is then referred to so as to find importance of a phone call party group (here, the importance of the phone call party group is regarded as B) (step S504).

Judgment is then made as to whether or not the importance A of the schedule is more important than or equal to the importance B of the phone call party group (step S505). When the importance A of the schedule is more important than or equal to the importance B of the phone call party group (Y), an instruction to notify is given to the user notification unit 44 (step S506). On the other hand, when the terminal status is viewing TV or on standby in the step S502, an instruction to notify is given to the user notification unit 44 (step S506). Thus, the subroutine for performing notification 2 in accordance with notification conditions is completed.

The operation example at the start time of a reserved program is described here in brief. (A) When the reserved program is being viewed at the program start time, (1) video/audio recording is started, (2) program start is previously announced a predetermined time before the reserved time, (3) program/scene start (under the condition that the program is being viewed) is notified (by voice or display).

(B) When another program than the reserved program is being viewed, (1) video/audio recording is started (selection can be made only if simultaneous reception of a plurality of programs are allowed), (2) program start is previously announced a predetermined time before the reserved time, (3) program/scene start (under the condition that another program is being viewed) is notified (by voice or display), and (4) the program/scene is forcedly changed to the reserved program/scene.

(C) During a phone call, (1) video/audio recording is started (selection can be made only if simultaneous processing of recording and phone call is allowed), (2) reproduction of the reserved program is started (sound is superposed on the voice of the phone call), (3) program start is previously announced a predetermined time before the reserved time, and (4) program/scene start is notified (by voice or display). (D) When the terminal is on standby (inoperative), (1) video/audio recording is started.

Next, variations in the operation example in the portable phone terminal according to the embodiment will be described. (E) When program start is notified by sound as a notification method during a phone call, there are a method for sounding a speaker of the body and a method for superposing notification sound on the voice of the phone call and reproducing the resulting sound through a headset, as variations of the operation example.

(F) When a setting pattern often used is prepared in advance and selected as a method for setting an operation of the terminal, a unit for setting a desired processing mode for the terminal operation control unit 43 is provided to the user so that the user can indirectly select an operation when the time comes to a reserved time point.

(G) When the program starts, an operation as an operation in an "engaged in phone call" status at the time of occurrence of an alarm is changed in accordance with a phone call party obtained by referring to address directory information registered in the terminal. If the phone call party is an important party, reproduction/notification is not performed.

(H) When information concerned with a broadcast schedule is available by some method before the time comes to the program start time, "reserved time" is updated based on the information, as a way to change reservation details of the program. In this manner, for example, change in broadcast times after then due to extension of live broadcast of a baseball game can be dealt with (on the assumption that EPG is used).

The invention is applicable to the case where an optimal method is selected automatically and notification is sent in accordance with start of a program desired to be viewed or listened to, start of a desired scene, at the time of notification of an alarm, a terminal status (on standby, engaged in phone call, etc.) and importance of notification in a communication terminal such as a portable phone terminal having a built-in TV/radio broadcast reception function, a built-in alarm notification function, etc.

Although a portable phone terminal has been described above as an example, the invention can be also applied to a game machine having a TV reception function and a communication function, a PDA having a TV reception function and a communication function (chat function etc.), etc.

Although description has been made on the case where a terminal status is detected based on at least one of a program output status, a phone call status and a standby status, at least one of a status (communication status) in which communication such as chat, phone conference, streaming reproduction, file downloading, etc. is being performed, a status (contents reproduction status) in which music recorded in a memory, a recorded program etc. is being reproduced, etc. may be detected.

A program for setting a desirable processing mode such as details of respective setting tables for the terminal operation control unit may be read from the outside (a network, broadcasting, an external apparatus, a storage medium, etc.).

Although the invention has been described in detail and with reference to specific embodiments, it is obvious to those skilled in the art that various changes or modifications can be made without departing from the spirit and scope of the invention.

The present application is based on a Japanese Patent Application (patent application No. 2004-247929) filed on Aug. 27, 2004, the contents of which are incorporated herein by reference.

INDUSTRIAL APPLICABILITY

According to the invention, there is provided a control unit for performing control to correct a reserved process in accordance with a terminal status up to a predetermined point of time, so that the reserved process such as recording/display of a broadcast program etc. can be corrected in accordance with the terminal status. Accordingly, there is an effect that a user's intention changing in accordance with the terminal status can be reflected properly so that convenience can be improved. Thus, the invention is useable for a communication terminal etc. having a broadcast program reception function.

The invention claimed is:

1. A communication terminal having a broadcast program reception function, comprising:
   a reservation unit that reserves a process for a broadcast program;
   a terminal status detection unit that detects an internal terminal status of the communication terminal, wherein the terminal status detection unit detects the terminal status based on at least one of an output status of a program executing on said communication terminal, a phone call status of a phone call being conducted with said communication terminal, a contents reproduction status of content being reproduced on said communication terminal, and/or a standby status of said communication terminal; and
   a control unit that performs control to correct the reserved process by correcting a starting time of recording a reserved broadcast program in said communication terminal in accordance with the terminal status; wherein
   the control unit performs control in accordance with levels of importance set for programs respectively, and wherein the levels of importance are set by a user
   wherein the control unit recognizes image data of the broadcast program, extracts information on broadcast program from the recognized image data, and performs controls in accordance with the extracted information on the broadcast program.

2. The communication terminal according to claim 1, wherein the control unit performs control to send alarm notification.

3. The communication terminal according to claim 1, wherein the control unit performs control to output a reserved broadcast program audibly and visibly.

4. The communication terminal according claim 1, wherein the control unit performs control to record a reserved broadcast program.

5. The communication terminal according to claim 1, wherein the control unit performs control in a processing mode set by a user.

6. The communication terminal according to claim 1, wherein the control unit performs control in accordance with kinds of contents of output broadcast programs.

7. The communication terminal according to claim 1, wherein
   said control unit performs control of said communication terminal to correct the reserved process in accordance with an importance value set for the reserved process of said communication terminal and a different importance value set for a phone call process being conducted on said communication terminal such that the process having the more important setting is given precedence over the process having the less important setting.

8. The communication terminal according to claim 7, further comprising:
   a program information extraction unit that extracts information with respect to contents or a broadcast time of the broadcast program,
   wherein the control unit also performs control in accordance with the extracted information.

9. The communication terminal according to claim 1, wherein the control unit also performs controls in accordance with an image recognition result of the broadcast program.

10. The communication terminal according to claim 1, further comprising: a setting unit that sets a desirable processing mode for the control unit.

11. A communication terminal having a broadcast program reception function, comprising:
    a reservation unit that reserves a process for a broadcast program;
    a terminal status detection unit that detects an internal terminal status of the communication terminal, wherein the terminal status detection unit detects the terminal status based on at least one of an output status of a program executing on said communication terminal, a phone call status of a phone call being conducted with said communication terminal, a contents reproduction status of content being reproduced on said communication terminal, and/or a standby status of said communication terminal; and
    a control unit that performs control to correct the reserved process by correcting a starting time of recording a reserved broadcast program in said communication terminal in accordance with the terminal status, wherein
    the control unit recognizes image data of the broadcast program, extracts information on broadcast program from the recognized image data, and performs controls in accordance with the extracted information on the broadcast program.

* * * * *